(No Model.)

J. G. BAILEY.
MAKING PLOW COLTERS.

No. 358,828.              Patented Mar. 8, 1887.

Witnesses.
W. McIntosh
Hugh Ross

Inventor.
James Gage Bailey

United States Patent Office.

JAMES GAGE BAILEY, OF RICHMOND HILL, ONTARIO, CANADA.

MAKING PLOW-COLTERS.

SPECIFICATION forming part of Letters Patent No. 358,828, dated March 8, 1887.

Application filed September 4, 1886. Serial No. 212,760. (No model.)

*To all whom it may concern:*

Be it known that I, JAMES GAGE BAILEY, of the village of Richmond Hill, in the county of York and Province of Ontario, Canada, spring-maker, have invented certain new and useful Improvements in Plow-Colters and in the Method of Manufacturing Plow-Colters, of which the following is a specification.

The object of the invention is, first, to design a light-weight plow-colter possessing the necessary rigidity to render it serviceable; and second, to devise a simple method of manufacturing plow-colters. I attain these objects by the use of metal bars, preferably of steel, of the forms illustrated in the accompanying drawings, in which—

Figure 1:
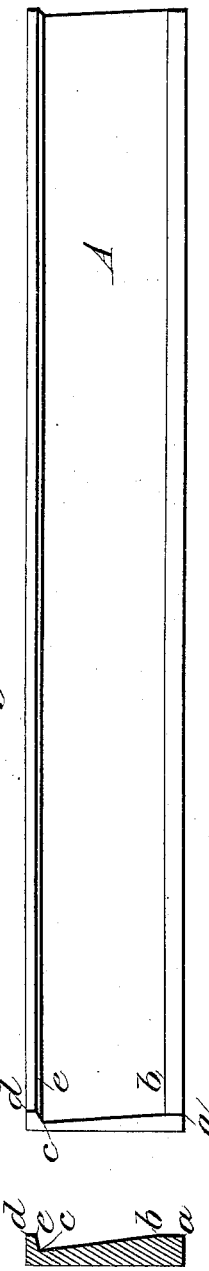
Figure 2:
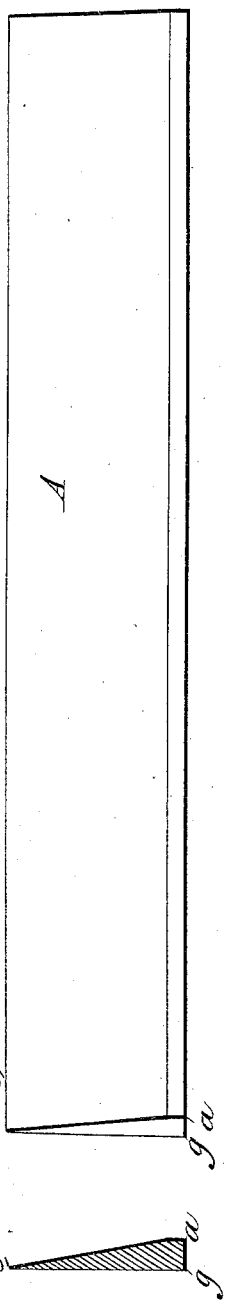
Figure 3:
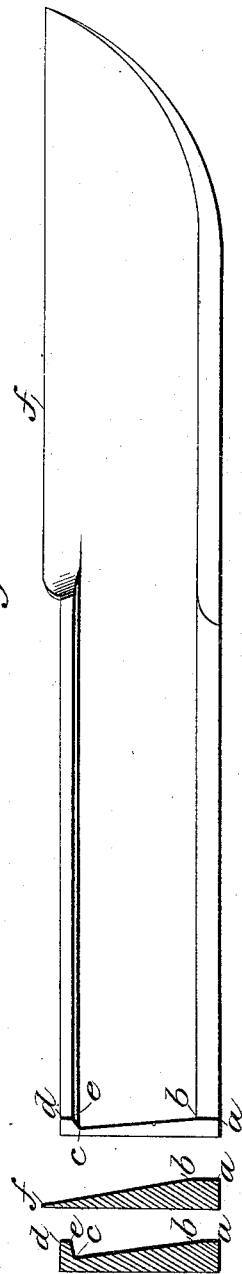

Figure 1 is a view of the metal bar from which the colter is to be made, showing the surface of the side which has the depression, and also a cross-section of the same bar. Fig. 2 represents another form of the bar from which the colter is to be made, showing the surface which has the depression, and also a cross section of the same bar. Fig. 3 is a view of the finished colter with cross-sections of the same.

Similar letters refer to similar parts throughout the several views.

In the manufacture of plow-colters I use a metal bar, A, Fig. 1, the one side of which has the center portion of its surface depressed in the form of an inclined plane, said depression beginning at or near to one edge, $a$, at the surface, and continuing to the point $c$, below the plane of the surface near to the opposite edge, $d$. This bar is the proper shape for the upper portion of the colter. To form its cutting-edge, I turn outward a sufficient portion of the edge $d\,e$, the angle of the inclined plane surface $b\,c$ being such as, continued on the portion of the edge $d\,e$ turned outward, is suitable for the formation of the said cutting-edge. An equivalent process is by using a metal bar, A, Fig. 2, one edge, $a\,g$, of which is of a thickness suitable for the back of the colter, and the opposite edge, $f$, of a proper thickness for the cutting-edge $f$, thus having one side, $a\,f$, of the bar inclined toward the plane of the opposite side. This bar is the proper shape for the blade of the colter. To form the upper part of the colter, I turn a sufficient portion of the sharp edge $f$ in such a manner as to make it correspond with the opposite edge, $a\,g$, in thickness. Either process produces the same colter as in Fig. 3.

It will be noticed that a cross-section of the upper portion of the finished colter, Fig. 3, corresponds with a cross-section of the bar A, Fig. 1, and that a cross-section of the blade of the finished colter corresponds with a cross-section of the metal bar A shown in Fig. 2; also, that the bar shown in Fig. 1 is of the same width as the upper portion of the finished colter, while the metal bar shown in Fig. 2 is of the same width as the blade of the finished colter.

I do not claim any advantage over the ordinary colter in regard to its working principle; but What I do claim as my invention, and which I desire to secure by Letters Patent, is—

1. A plow-colter the portion above the blade of which is hollowed on one side, substantially as described, and for the purpose specified.

2. A metal bar, A, of the form represented in Fig. 1, substantially as described, for use in the manufacture of plow-colters.

3. A plow-colter made from a metal bar, A, of the form represented in Fig. 1, substantially as described, and in the manner specified.

JAMES GAGE BAILEY.

Witnesses:
M. LEEFY,
CHAS. E. SHEPPARD.